(No Model.) 2 Sheets—Sheet 1.
M. TOULMIN.
COAL CART.
No. 409,620. Patented Aug. 20, 1889.
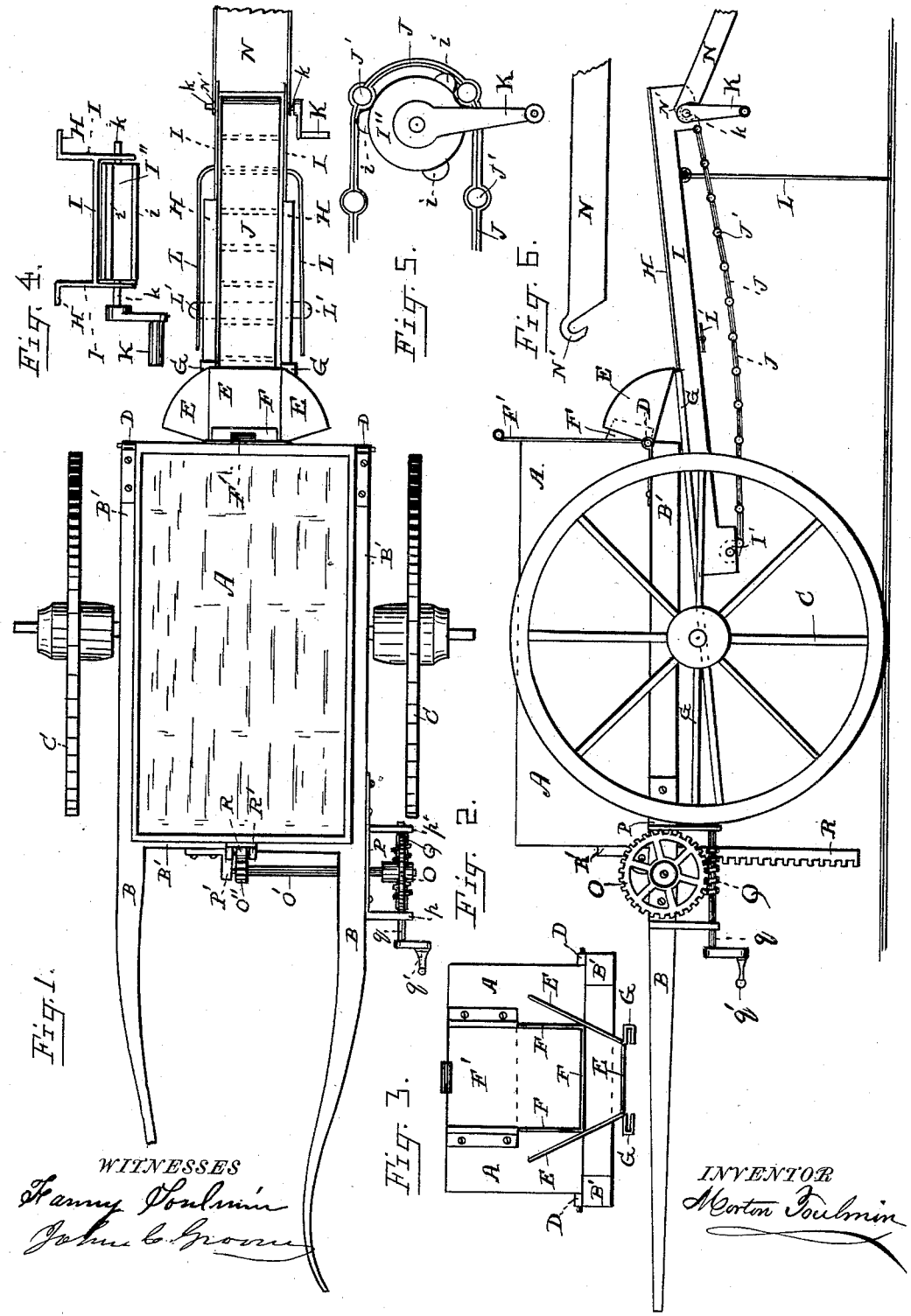
WITNESSES
INVENTOR

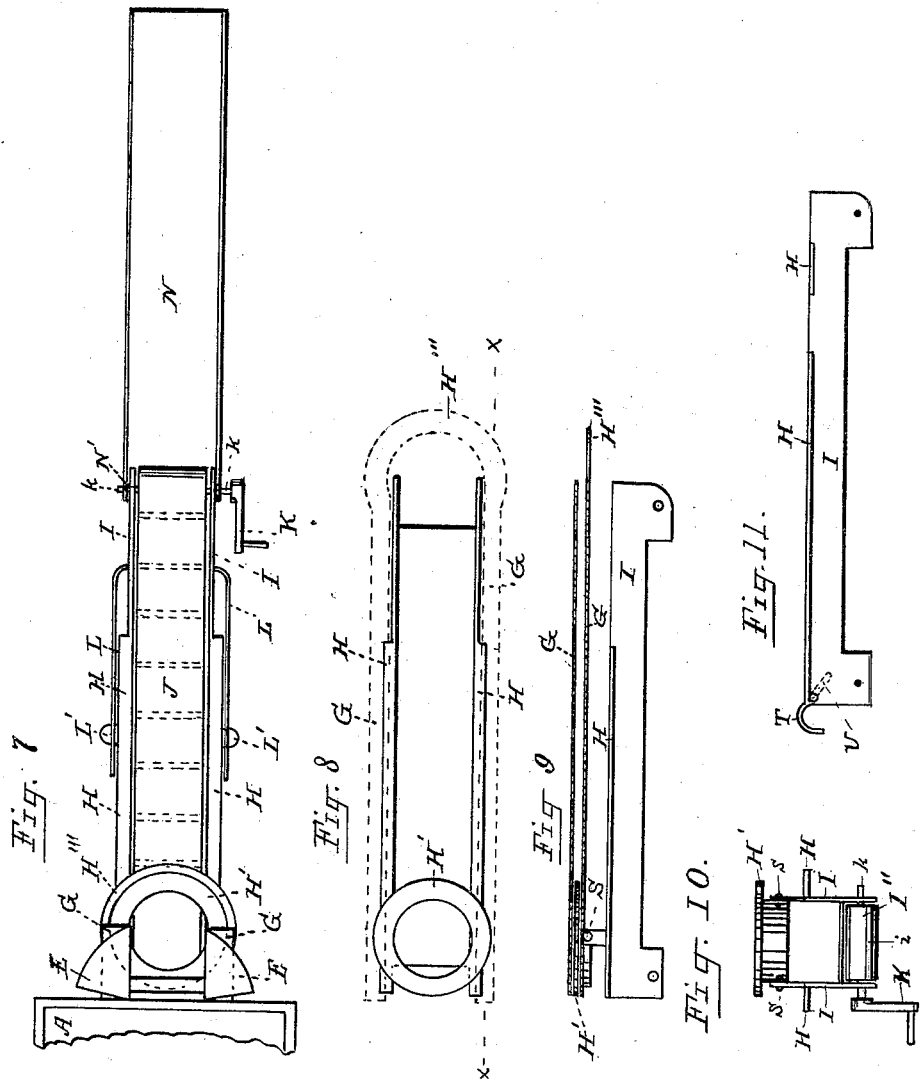

UNITED STATES PATENT OFFICE.

MORTON TOULMIN, OF BALTIMORE, MARYLAND, ASSIGNOR OF TWO-THIRDS TO FRANK C. FENHAGEN, OF SAME PLACE, AND PETER G. ZOUCK, OF GLEN MORRIS, MARYLAND.

COAL-CART.

SPECIFICATION forming part of Letters Patent No. 409,620, dated August 20, 1889.

Application filed October 30, 1888. Renewed July 24, 1889. Serial No. 318,497. (No model.)

*To all whom it may concern:*

Be it known that I, MORTON TOULMIN, a citizen of the United States, residing at Baltimore, in the State of Maryland, have invented certain new and useful Improvements in Carts in Combination with a Conveyer and Chute; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in carts in combination with a conveyer and chute, whereby coal may be discharged into a cellar.

The object of the invention is to provide a coal-cart cheaper and lighter than those now in use for the above-named purpose, and which may be unloaded into a cellar across a pavement with the side of the cart parallel thereto, and thus avoid the obstruction to traffic on the street, particularly to the passage of street-cars.

The nature of the invention consists in providing a dump-cart (or wagon) with suitable mechanism whereby the front portion of the cart may be raised and held in an elevated position, and, when so raised, in providing the cart with suitable means whereby a conveyer may be attached to the rear end thereof; in providing the conveyer with hinged legs, whereby its free end may be supported a suitable distance above the pavement or ground where the contents of the cart are to be discharged; also, in providing a removable chute having suitable devices, whereby it may be attached to the conveyer.

In the drawings forming a part of this specification, Figure 1 is a plan view of a cart having the conveyer partly drawn out and the chute attached thereto, but broken off at the rear end. Fig. 2 is a side elevation of the above. Fig. 3 is a rear view of cart-body and some of its connections. Fig. 4 is a rear end view of the conveyer enlarged. Fig. 5 is an enlarged view of part of the conveyer-belt, roller, and crank detached from the conveyer. Fig. 6 is a side view of the end of the chute having hooks by means of which it is attached to the conveyer, the other end being broken off. Figs. 7, 8, and 9 illustrate the construction and arrangement of parts for attaching the conveyer to the cart, whereby it may be raised and lowered, and swung in any direction within a half-circle. Fig. 10 is an end view of the conveyer, as shown in Fig. 8. Fig. 11 is a modified form of conveyer having hooks T to attach it to a cart or wagon, and a stop U in dotted lines to prevent the escape of coal by the rear end of the conveyer.

The letter A indicates the cart-body; B, the shafts of the cart; B', the frame to which the body of the cart is hinged, which may or may not be an extension in the rear of the shafts B.

C are the wheels of the cart.

D are the hinges by means of which the body is secured to the frame B'.

E is a hopper attached to frame B'.

F is a hopper attached to the cart-body.

F' is a sliding door to close an opening in the tail-board of the cart. (Indicated in dotted lines in Fig. 3.)

G are two grooved pieces or guides of metal, their inner faces having grooves formed therein by bending the metal in substantially rectangular form, leaving their adjacent faces open, parallel with each other, and equidistant throughout their entire length, which are secured, in any suitable manner, beneath the cart-body—preferably to the frame B'—its forward end being lower than its rear end, thereby giving a slant or forward and downward incline thereto adapted to receive the slides H or the ring-piece H', and permitting them to slide therein from one end to the other, for purposes hereinafter described.

I is the conveyer, consisting of a trough of wood or metal, with a suitable opening at each end to receive the rollers I' I'', which carry an endless belt J, having cross-pieces J' placed in transverse pockets in the belt, which is preferably made of two thicknesses of canvas, with the cross-pieces J' placed between the two and stitched together so as to form the pockets for their reception. The roller I″ has longitudinal strips $i$ secured thereon, which engage with the cross-pieces J′ and prevent the belt J from slipping. The cross-pieces J′ enable the belt to carry the coal up even at an angle of forty-five degrees.

K is the crank-handle attached to the shaft $k$, upon which the roller I″ is mounted.

L are the legs, which serve to support the free end of the conveyer when drawn out from beneath the cart. When not in use, these legs are held up out of the way by means of a piece L′, which is pivoted to the under side of the conveyer I, and may be turned on its axis so as to permit the legs L to be placed in the position shown in Fig. 1.

N is a chute—preferably a metal trough—and is provided with hooks N′, whereby it may be attached to the shaft $k$ of the conveyer I.

O is a spur-wheel mounted on a shaft O′, the said shaft having bearings P and P′ attached to the shafts B and frame B′. The wheel O meshes with a worm Q, having a shaft $q$ resting in the bearings $p$ $p'$ and provided with crank-handle $q'$. The shaft O′ has a pinion O″, which meshes into the pivoted rack-bar R, the upper end of which is pivoted to the cart-body A by means of a suitable metal connection R′.

H‴ is a semicircular piece of metal secured to the outer ends of the grooved pieces G, as shown in Figs. 7, 8, and 9, and is intended to limit the movement of the ring H′ and prevent its becoming detached from the pieces G, in the grooves of which it is intended to slide from one end of the cart to the other. The ring H′ is attached to the conveyer I by means of a pivoted or hinged joint S. This arrangement, when the conveyer is drawn out to its full extent, enables the outer end of the conveyer to be raised or lowered or to be swung in any direction within a half-circle, so that if the cart or wagon is standing with its sides parallel with the roadway its contents may be discharged at right angles to the direction of the road, as well as in many other directions, should it be desired to do so.

It will be readily observed that by turning the crank $q$ in one direction the front portion of the cart may be raised, and if turned in the opposite direction it will be lowered; also, that worm Q serves to lock the worm-wheel $o$ when the worm is at rest, and thereby enable the front end of the cart-body to be elevated and maintained in any position within the scope of the mechanism.

I do not confine myself to the exact construction herein described, and shown in the drawings, as other forms might still be within the scope of my invention.

What I desire to secure by Letters Patent, and claim, is—

1. The combination, with the frame and body, the latter being hinged to the former, of a hopper secured to the rear of the frame and a hopper secured to the rear of the body, the sliding door F in the tail-board, the parallel grooved guides rigidly secured to the frame below the body, the conveyer I, having flanges or slides H on its upper edge working in the grooves of the guides, and the endless belt J in the conveyer, substantially as described.

2. The combination, with the frame and body, of the grooved guides G below the body, inclining downwardly toward the front, the conveyer I, having flanges or slides H on its upper edge, which work in grooves formed in the guides, and the endless conveyer-belt J, substantially as described.

3. The combination, with the frame and body of a cart, of forwardly and downwardly inclined guides secured to the frame beneath the body, the semicircular piece, as H‴, formed on the rear end of the guides, the conveyer-trough I, having a ring H′ on its inner end working in said guides and semicircular piece, and the endless belt J, substantially as described.

4. The combination, with the frame, of the body hinged thereto, a vertically-arranged rack-bar pivotally secured to the front of the body, a pinion meshing with the rack-bar, a shaft on which said pinion is mounted extending to the outside of the frame, a gear on the outer end of the shaft, a screw meshing with said gear, and a frame supporting the screw, substantially as described.

5. The combination, with the frame and body of a cart, of a conveyer-trough, having rollers, as I′ and I″, located, respectively, in the ends thereof, said rollers having a series of ribs, as $i$, thereon, the conveyer-belt J, having transverse pieces secured thereto, and a handle for moving the outer roller, substantially as described.

In testimony whereof I affix my signature in presence of two witnesses.

MORTON TOULMIN.

Witnesses:
 JNO. T. MADDOX,
 JOHN C. GROOM.